Nov. 14, 1939.   C. ORT   2,180,017
CAMERA WITH RANGE FINDER
Filed March 16, 1937
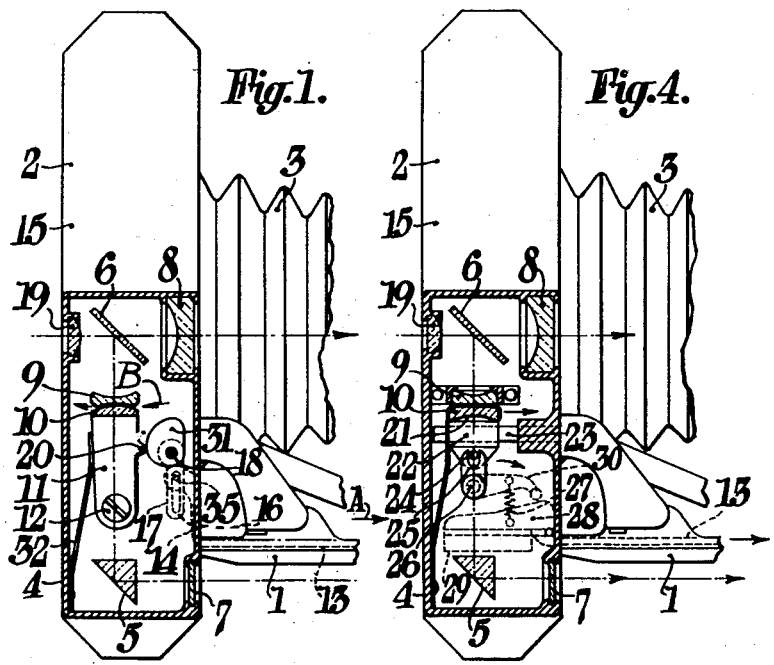
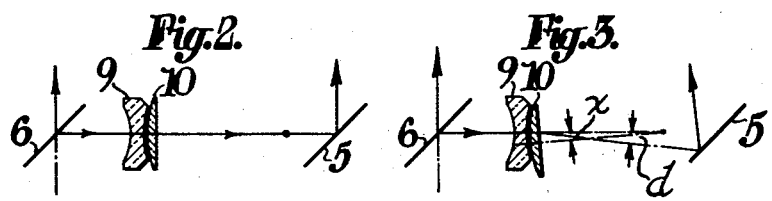
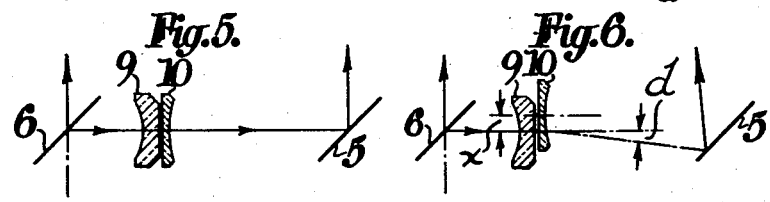
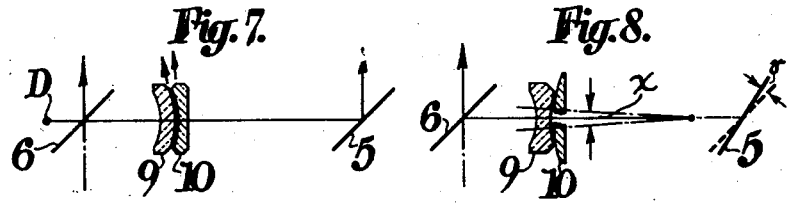
Carl Ort,
INVENTOR:
BY
ATTORNEYS.

Patented Nov. 14, 1939

2,180,017

UNITED STATES PATENT OFFICE 2,180,017

CAMERA WITH RANGE FINDER

Carl Ort, Stuttgart, Germany, assignor to Eastman Kodak Company, Rochester, N. Y., a corporation of New Jersey Application March 16, 1937, Serial No. 131,164
In Germany May 22, 1936

4 Claims. (Cl. 95—44)

This invention relates to a base-type range finder combined with a view finder as by making one end of the range finder base in the form of a semi-transparent mirror disposed between the objective and eye-piece of the view finder and is particularly adapted to be coupled to the focusing movement of a camera. In one such known arrangement the range finder is provided with an objective lens of the same focal lengths as the view finder objective in order to ensure that the size of the range finder image may be the same as that of the view finder.

Further, in this known arrangement, one of the ray deflecting mirrors forming the range finder base is made angularly adjustable in order to permit two images of an object seen through the eye-piece to be made to coincide.

Now, if, with this known arrangement a deviation of the rays through an angle $w$ becomes necessary to effect coincidence of the images, then to achieve this, the mirror must be turned through an angle of only $$\frac{w}{2}$$

With a range finder having a base of 40 mm. length, in which for the full range of focussing movement of the objective from $\infty$ to 1 meter, the total angle of deviation of the rays is $w=2°\ 17'\ 26''$ and the angular movement of the mirror is thus $$\frac{w}{2} \text{ or } 1°\ 8'\ 43''$$

It is now known that owing to this very small angular adjustment, the accuracy required in the construction and mounting of the cam and other parts of the coupling mechanism between the camera objective and the range finder is extraordinarily high.

However, other base-type range finders combined with view finders have been proposed in which a ray deviating objective of the rangefinder is either disposed between the ends of the base so as to be movable perpendicularly to the base, or is mounted so as to be transversely movable with respect to the direction of vision, and therefore parallel to the base. These prior arrangements have the disadvantage that if the focal length of the view finder objective is made small, the required displacement of the movable range finder objective for deviating the rays is also relatively small. For example, with a view finder objective having a focal length of 25 mm. the displacement would be 1 mm. for the full range of focussing movement of the objective from infinity to a near distance of 1 meter. Moreover, with a pronounced curvature of the surface of the objective lens, the image becomes distorted upon lateral displacement of such lens: this results in the accuracy of the range finder being impaired.

According to the present invention these disadvantages are eliminated by providing a combined base-type range finder and view finder in in which a range finder objective of equal refractive power to that of the view finder is composed of at least two members of equal or differing refractive power, one of which is relatively fixed, while the other is movable for the purpose of deviating the rays.

Several forms of the invention are illustrated by way of example in the accompanying drawing in which:

Figure 1 is a side elevation of the rear part of a folding camera carrying a combined view finder and range finder, illustrated in section.

Figures 2 and 3 are optical diagrams corresponding to Figure 1.

Figure 4 is a similar view to Figure 1, illustrating a modified form of range finder objective.

Figures 5 and 6 are optical diagrams corresponding to Figure 4.

Figures 7 and 8 are optical diagrams illustrating further modifications of range finder objective according to the invention.

Referring first to Figure 1, a camera bed 1 is hinged to the camera body 2 which carries the usual bellows 3. A casing 4 for a combined range finder and view finder is carried by one side wall 15 of the camera body. The range finder illustrated in this figure comprises stationary reflection elements 5 and 6 spaced apart in the casing 4 to constitute the range finder base. A window or opening 7 is arranged in the front wall of the casing 4 in line with the reflecting prism 5. The other reflecting element 6 of the range-finder is shown as a semi-transparent mirror disposed in the path of the rays of the view finder carried by the casing 4. This view finder comprises an objective 8 and an eye-lens or ocular 19. A range finder objective is disposed between the reflecting elements 5 and 6 and in accordance with the present invention comprises two lenses which preferably are differing refractive power. One of the lenses 9 having the greater refractive power is fixed, while the other lens 10 of the objective of smaller refractive power is movable relatively to the optical axis of the stationary lens 9 in order to effect deviation of the rays reflected by the prism 5. This lens 10 is carried by an arm 11 pivoted about a pin 12 having its axis coincident with the centre of curvature of the opposed surfaces of the lenses 9, 10. As the outer face of the lens 10 is plane and the adjacent or nearly contacting surfaces of the two lenses 9 and 10 are curved, such lenses together bear some similarity to the well-known Boscovich wedge. A Boscovich wedge, however, is composed of a plane-convex and a plane-concave lens so arranged that there is an optical null effect, i. e., it forms a plane glass parallel plate, when the optical axes of the two lenses coincide, whereas, according to the invention in all positions of the movable lens 10 the objective as a whole has a refractive power corresponding to that of the view finder objective 8. The movable lens 10 is adapted to be adjusted in accordance with the movement of the camera objective during focussing. For this purpose a sliding carriage 13 which supports the camera objective, not illustrated, for sliding movement on the camera bed, is provided at its rear end with a bracket 14. This bracket extends into the camera housing and has a horizontal pin 35 which passes through the side wall 15 of the camera body and engages in a slot 16 formed in a radial arm 17 fixed to a pivot 18 to which is also secured a cam 31. The cam 31 contacts with a projection 20 of the arm 11. The cam 31 is shaped so that upon focussing of the objective in the direction of the arrow A the movable lens 10 is correspondingly adjusted in the direction of arrow B until, as is well understood in the art, the double images of an object seen through the eye-piece 19 of the direct vision view finder are coincident, whereupon the camera will be correctly focussed. During such movements the arm 11 is acted upon by a blade spring 32 so as to keep it in contact with the cam 31.

The plane surface of the lens 10 which, during adjustment of the range finder, is inclined to the optical axis of the base deviates the rays reflected from the prism 5. Let us by way of example consider a plano-convex lens element made of crown glass having an index of refraction $N=1.55$. If the range finder has a base of 40 mm. length, and it is necessary in focusing a given object to effect deviation of the rays through an angle $d$ of 2° 17′ 26″ then a normal to the plane surface of the lens 10 must be inclined at an angle of 4° 23′ 20″ to the optical axis, and accordingly the lens 10 must be moved through this angle. The manner in which this angle is computed is as follows: In Figure 3, if the lens 10 is tipped through an angle X so that a ray from the mirrors 5 (striking it at an angle 2° 17′ 26″ to the optic axis) is refracted to come out along the optic axis, the angle of refraction must also be X. The angle of incidence is X+2° 17′ 26″. Solving the equation given by Snell's law of refraction; sin $$(2° \ 17' \ 26''+X)=1.55 \sin X,$$

we get X equals 4° 23′ 20″. It will be appreciated that this required angular shift represents a distinct advantage as compared with the known type of range finder in which one of the reflecting elements of the base is adjusted for deviating the rays, as with this type of range finder to achieve a deviation of the ray through an angle of 2° 17′ 26″ the movable reflecting element must only be moved through an angle of 1° 8′ 43″. It will thus be seen that the present invention imposes considerably less accuracy in the coupling mechanism between the objective and the range finder and in the mounting of the movable lens as compared with the equivalent members associated with the aforesaid known type of range finder.

Preferably, the surfaces of the double concave lens 9 have curvatures of equal radii so as to obviate incorrect mounting of the lens 9 in the range finder.

Referring now to Figures 4–6 in which parts similar to Figure 1 are designated with like reference numerals, the movable lens of the range finder objective is adapted to be adjusted rectilinearly. As illustrated, the opposing faces of the lenses 9, 10 in these figures are plane and consequently in order to impart the correct refractive power to the lens 10 the other surface is suitably curved, as indicated at 21. As with the form of the invention described with reference to Figures 1–3, the modified construction of range finder objective is coupled with the focussing movement of the camera. For this purpose the movable lens 10 is carried in a mount 22 for sliding movement on a square section pin 23 supported between the front and rear walls of the range finder casing 4. The lens mount 22 is provided with a pin 24 for engagement by a forked arm 25 fixed on a pin 26 which is journalled in and extends through the adjacent wall of the camera body. Another arm 30 fixed to the pin 26 is maintained by a spring 27 in contact with a cam plate 28 which is mounted for sliding movement in guides 29 secured to inside the camera body. The cam plate 28 is connected to the rear end of the supplementary bed or carriage 13 which supports the camera objective. Focussing is effected by moving the objective in the direction of the arrow and accordingly the cam is moved in the same direction. This results in appropriate movement of the lens 10 through the medium of the pivoted double lever system 25, 30. It will be appreciated from Figure 6 that to effect a given angular deviation of the rays reaching one end of the base through the beam accepting window 7, Figure 4, a moderately large movement of the lens 10 is necessary.

It will be evident upon comparison of Figures 3 and 6, that the larger the radius of curvature of the inner face of the movable lens 10, the greater is the adjustment thereof to effect a given deviation of the ray, or in other words the longer the focal length of the lens 10 the greater will be the displacement thereof for effecting a given deviation of the rays. When the movable lens has a relatively long focal length the image is not impaired owing to the slight curvature. It is thus possible to make the displacement of the movable lens as high as, for example 4 mm., thereby reducing adjustment difficulties to a minimum whilst retaining a good quality of image. It is necessary, however, for the combined refractive power of the two lenses 9, 10 constituting the range finder objective to correspond accurately to that of the view finder objective.

Figure 7 diagrammatically illustrates a modification which is essentially similar to that illustrated in Figures 1–3, except that the swinging movement of the lens 10 occurs in the direction of the arrow about a point D outside the range finder base instead of about a point between the ends thereof. With this form, therefore, the stationary lens 9 is a concave-convex lens.

Figure 8 diagrammatically illustrates a further modification involving in addition to the movement of the lens 10 slight adjustment of the reflecting element 5 of the range finder base. The lens 10 in this form is movable to one side of the axis of the base to set the range finder objective for infinity position of the camera objective, and to the other side of the base to set the objective for the shortest distance. In the position in which the optical axes of the lenses 9, 10 coincide the camera objective will be adjusted or set for an intermediate distance of about 3 m. For this position, however, the two reflecting elements of the range finder base are no longer kept parallel to each other. Instead the reflecting element 5 is adjusted for this near distance through an angle $\mu$. By this expedient it is possible if the two lenses 9, 10 are similarly dimensioned to obtain double the deviation of the measuring rays. That is, the total range of operation of the light deviating device is shifted so that it covers from about ½ meter to infinity (including 3 m., as its intermediate point) rather than 2 meters to somewhere "beyond infinity" with infinity as its intermediate point. The amount of deviation for a given rotation of the lens 10 is, of course, the same.

It will be understood that the range finder objective and also the view finder objective may have a negative or a positive refractive power. If the objectives have a positive refractive power then image reversing means should be provided between such objective and the eye lens.

Having now particularly described and ascertained the nature of my invention, and in what manner the same is to be performed, I declare that what I claim is:

1. The combination of a focusing camera and a range finder having an operating lever adapted to be actuated in accordance with the movement occuring in focusing the camera, said range finder being of the two field type, an ocular, a negative objective lens consisting of a single element only in front of the ocular for forming a view finder and adapted to provide one of the range finder fields, a semi-transparent mirror positioned between the ocular and said lens, a light deflecting member spaced from said mirror to form the base of the range finder, and a second objective lens positioned in the light path between said member and said mirror to provide the other of the range finder images, said second objective lens having a refractive power equal to that of the view finder objective lens and consisting of two adjacent parts, the adjacent surfaces having equal curvature and one of which parts is movable and connected with the operating lever of the range finder.

2. A combined range and view finder adapted to be mounted on a camera having a part movable with the focusing adjustment of the camera, comprising two light deflecting members spaced to provide a base for the range finder, a view finder objective lens consisting of a single negative lens element and a range finder objective lens having equal refractive powers, an ocular positioned to receive light from the view finder objective and from one of said deflecting members, said range finder objective lens being positioned between said deflecting members and consisting of two adjacent lens elements, whose adjacent surfaces have equal curvature and one of which elements is movable and adapted to be coupled to the part of the camera movable in focusing.

3. A combined range and view finder as defined in claim 2, characterized by the light deflecting members forming the range finder base being relatively movable to adjust for shorter distances.

4. In a photographic camera, in combination, a member movable in focusing the camera, a combined base-type range and view finder carried by the camera and comprising as its optical system only a positive ocular common to both of the range finder fields, a single negative lens element spaced from the ocular on one of the optic axes of the range finder to form the view finder system and an objective lens having a refractive power equal to that of said negative lens element and being spaced from the ocular on the other range finder axis, said objective lens consisting of two adjacent components whose adjacent surfaces have equal curvature and one of which components is movable, and means for coupling said movable component with said movable member.

CARL ORT.